(12) United States Patent
Baciu et al.

(10) Patent No.: US 8,539,351 B2
(45) Date of Patent: Sep. 17, 2013

(54) OPTIMIZING ONLINE ADVERTISING LINK AND TEXT CHARACTERISTICS

(75) Inventors: Jonathan Baciu, San Francisco, CA (US); Tim Lawrence Martin, San Francisco, CA (US); Jason Vigen Menayan, Oakland, CA (US); James Norton Reitz, Oakland, CA (US); Paul Edmondson, Burlingame, CA (US)

(73) Assignee: YieldBuild, Inc., San Francsico, CA (US)

( * ) Notice: Subject to any disclaimer, the term of this patent is extended or adjusted under 35 U.S.C. 154(b) by 179 days.

(21) Appl. No.: 12/861,724

(22) Filed: Aug. 23, 2010

(65) Prior Publication Data

US 2011/0072343 A1    Mar. 24, 2011

Related U.S. Application Data

(60) Provisional application No. 61/235,953, filed on Aug. 21, 2009.

(51) Int. Cl.
*G06F 17/00* (2006.01)
*G06Q 30/00* (2012.01)

(52) U.S. Cl.
USPC ................. 715/275; 705/14.4; 705/14.41

(58) Field of Classification Search
USPC .................................... 715/207, 275
See application file for complete search history.

(56) References Cited

U.S. PATENT DOCUMENTS

| | | | | |
|---|---|---|---|---|
| 7,949,935 B2 * | 5/2011 | Friedman et al. | ............ | 715/205 |
| 2007/0101291 A1 * | 5/2007 | Forstall et al. | ................ | 715/805 |
| 2007/0192164 A1 * | 8/2007 | Nong et al. | ..................... | 705/10 |
| 2007/0300152 A1 * | 12/2007 | Baugher | ....................... | 715/522 |
| 2008/0140481 A1 * | 6/2008 | Gold | ........................... | 705/7 |
| 2008/0263143 A1 * | 10/2008 | Takahashi et al. | ............ | 709/203 |
| 2009/0094096 A1 * | 4/2009 | Riise et al. | ...................... | 705/10 |

* cited by examiner

*Primary Examiner* — Doug Hutton, Jr.
*Assistant Examiner* — Ariel Mercado
(74) *Attorney, Agent, or Firm* — Trellis IP Law Group, PC

(57) ABSTRACT

A method of modifying the color characteristics of advertising content and web page content to increase the click-through rate of the advertising content. The advertising content and web page content may include hyperlinks and text. The color characteristics may include saturation, hue, intensity, contrast, and RBG characteristics. The color characteristics may be modified to make the advertising content more visible to the user, which results in a higher click-through rate.

19 Claims, 8 Drawing Sheets

500

OPTIMIZING ONLINE ADVERTISING LINK AND TEXT CHARACTERISTICS

CROSS REFERENCES TO RELATED APPLICATIONS

This application claims priority from U.S. Provisional Patent Application Ser. No. 61/235,953, entitled OPTIMIZING ONLINE ADVERTISING LINK AND TEXT CHARACTERISTICS, filed on Aug. 21, 2009, which is hereby incorporated by reference as if set forth in full in this application for all purposes.

BACKGROUND

Electronic transmission and display of information is prevalent. Forms of electronic displays of information include web pages, electronic mail (email) and attachments, text messages, displaying documents such as text and image documents, spreadsheets, or other forms of files or data. Such information display can take place on many types of devices such as computer systems, billboard displays, cell phones, personal digital assistants (PDAs), email devices, cameras, etc.

Along with displaying main content that is the initial subject of interest to viewers, advertising or other commercial content is often included with the display of the main content. Displaying commercial content is an important revenue source for many providers of the main content, or for providers of other services or equipment that contribute to a user's access to the main content. One approach to providing advertising content includes ads that are adjacent to or embedded with portions of the main content. When the ad is displayed in a web page, many of the ad's characteristics (i.e., ad metadata) such as ad type, position within a web page, color, size, text font, animation, etc. become very important to whether a user notices the ad and reads the ad or otherwise reacts to the ad. Ideally, for the ad's sponsor, the user will click on the ad to be taken to a commercial website to be presented with additional product or service information or, ideally, to complete a sale. In many cases, the content providers are compensated on a per ad click basis. Even if the ad is merely noticed by the user, then a psychological attachment to the sponsor's product or service can be achieved which can have significant value to the ad's sponsor.

Many ads are blended with the main content. For example, the color of ad links matches the color of the content links, and the color of the ad description text matches the color of the content text. Many ads pay publishers based on the frequency of click-throughs. Accordingly, publishers have increasingly looked to blend their ads, believing this to provide the best click-through rate (CTR) performance, and thus, the optimal revenue generating format.

SUMMARY

In one embodiment, a method for displaying advertising content on a display device includes determining at least one color characteristic of the advertising content and the main content in a web page. The method also includes changing a first level of the at least one color characteristic for at least one portion of the advertising content in a first direction, and changing a second level of at least one color characteristic for at least one portion of the main content in a second direction.

DETAILED DESCRIPTION OF EMBODIMENTS

As described in more detail below, embodiments provide a system and method by which the colors of online ads can be modified in order to significantly improve their response rate (as measured by click-through rate or other standard online advertising performance metric). For example, in particular embodiments, a system may increase the saturation level of advertising hyperlinks (links) and may increase or decrease the saturation level of the advertising text.

Figure 1:
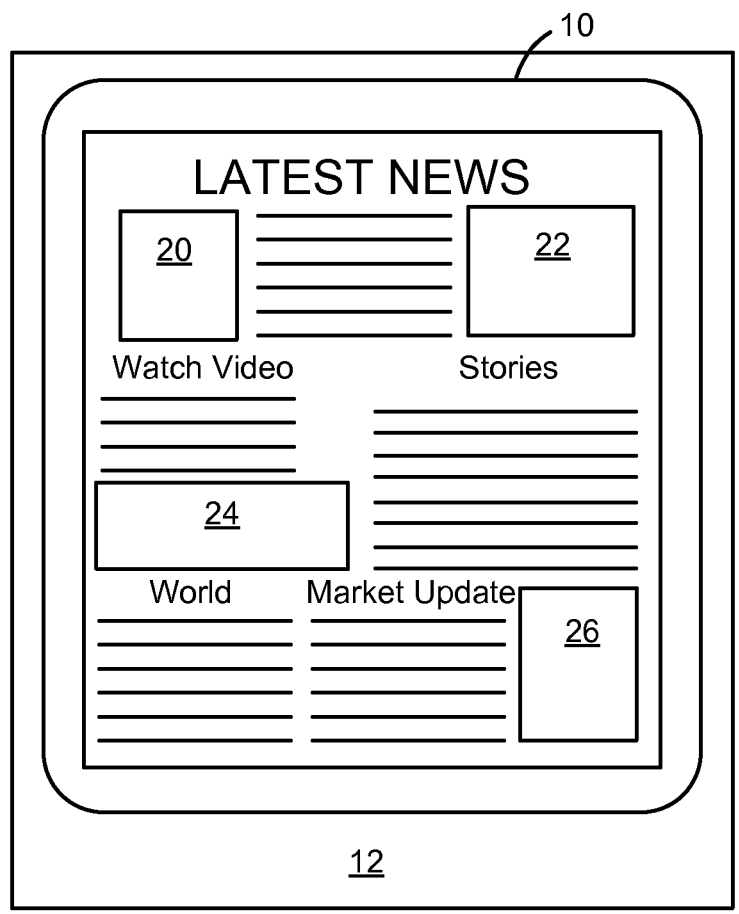
FIG. 1 illustrates a web page layout including main content and advertising content.

FIG. 1 illustrates a layout of web page 10. A web page such as web page 10 is typically provided in response to a user selection or signal such as when a user selects or clicks a link, or hyperlink, to the web page. A web browser or other display system or process executing on a device such as a computer is used to display the web page in response to a web page definition that can include text in a standard format such as Hyper Text Markup Language (HTML), Extensible HTML (XHTML), Extensible Markup Language (XML), JavaScript™, etc. Web pages can include various other mechanisms or definitions to assist in the display or presentation of information (e.g., image, sound, executable code, hyperlinks etc.) such as JavaScript™, Dynamic HTML (DHTML), Cascading Style Sheets (CSS), the Adobe Flash Platform, etc. Although a preferred embodiment is described with reference to web pages, any suitable system, format or approach to display electronic information may be used.

Web page 10 would typically be displayed on a display screen such as display screen 12. All or a portion of the web page might be displayed at any one time. Multiple web pages and/or other types of electronic information can also be displayed on one screen. The web page includes advertising content that can be positioned at slots such as advertising (ad) slots 20, 22, 24 and 26. Other content on the page such as text and images is referred to as "main content" since it is usually the content that is of primary or initial interest to a user who has selected the page. Note that any type of content may be used with features of the present invention. It should be apparent that FIG. 1 is only an example of a single layout for purposes of discussion, and the layout of other pages can vary widely.

For example, the size, shape, number and position of the ad slots can vary. The type and arrangement of the main content can change. A page may have one or more ad slots and may have no content other than ad content, if desired. Animations can be used in the ad and main content. Other mechanisms such as hyperlinks, digital video, color, etc. can be used as is known in the art.

In a preferred embodiment, ad slots 20, 22, 24, and 26 are areas of the page that can be filled with ad content at or before a time when a user requests the page, or the page is otherwise provided to a device for display. Ad content is defined to be displayed in one or more of the slots according to ad metadata or characteristics such as ad type, color, size, position, etc. An ad may occupy all or a fraction of an ad slot or the slot may be left empty or hidden. The position of the ad can include the slot to which an ad is assigned and the ad's position within the slot. In one embodiment, the presence of slots containing the ads may not be apparent at all to the user of the page. In other embodiments, ad position on a page does not have to be handled with slots but can be described by any other positioning scheme. For example, ad x,y coordinates with respect to a position on the page can be used. Or ad slot information may be an approximation of where an ad will be placed rather than a mandatory region. In some approaches, ads are allowed to move or float over the main content. Other approaches are possible.

Figure 2:
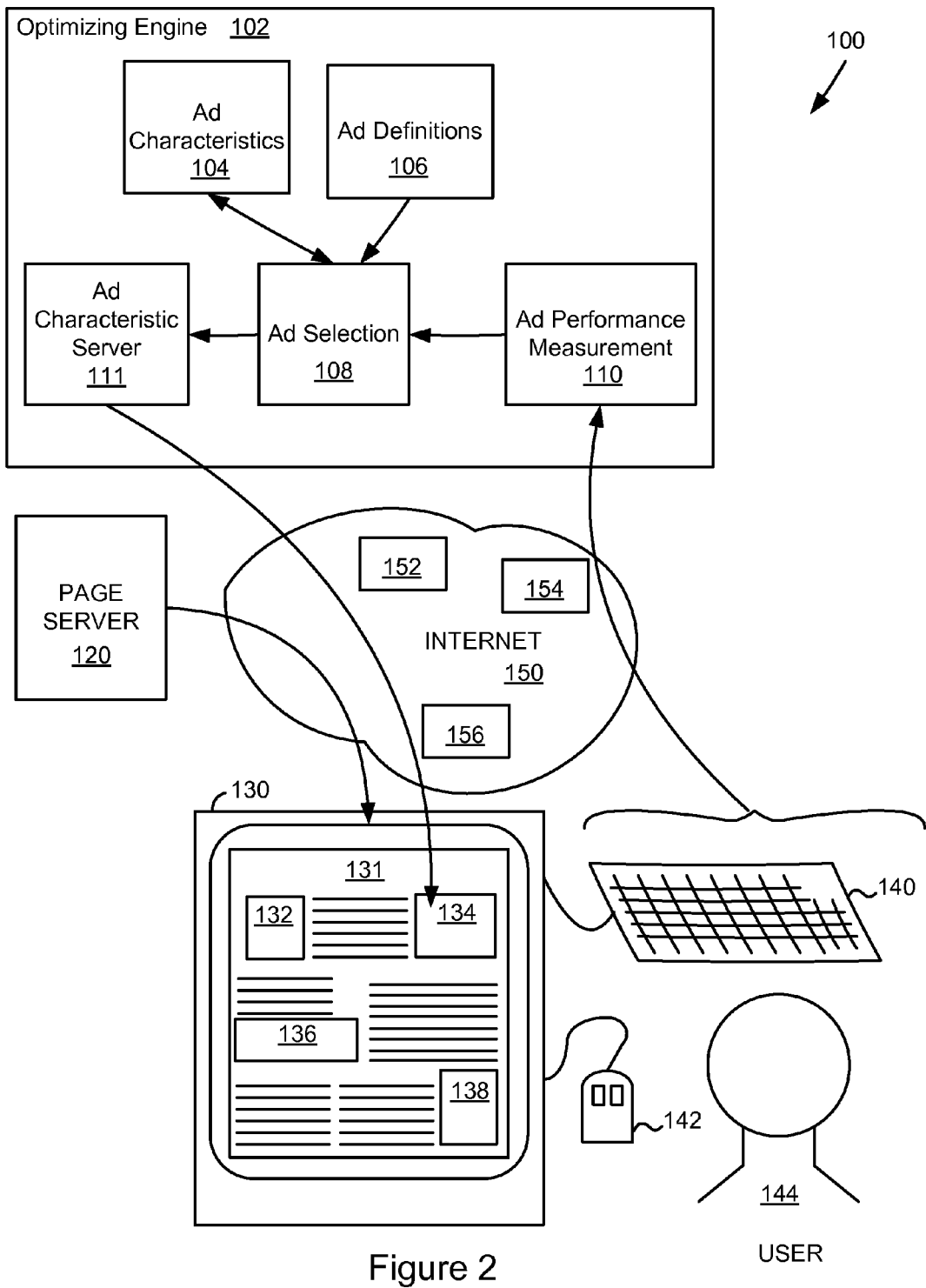
FIG. 2 shows basic components of a system for practicing embodiments of the invention over a digital network such as the Internet.

FIG. 2 illustrates basic components of a system for practicing an embodiment of the invention in a digital network such as the Internet. System 100 includes an optimizing engine 102 for generating web page layouts using different ad characteristics. Optimizing engine 102 includes stored ad characteristics 104, ad content definitions 106, ad selection process 108, ad characteristic server 111 and ad performance measurement 110. Note that the diagram of FIG. 2 is but one example of an arrangement of components in a system suitable for use with the invention. Many variations are possible including adding, deleting or modifying components, data paths or other aspects of the example system.

User 144 operates a computer system that includes display screen 130 and user input devices such as keyboard 140 and mouse 142. Although specific devices are shown, many other types of devices can be used. For example, user input devices can be any suitable type of device such as a trackball, touch screen, motion or gesture detection, image or voice recognition, etc. Other basic components that may be used in a computer system are not specifically shown. For example, a processor, memory, hard disk drive, input/output ports and connectors, etc. are not shown but it should be apparent that such devices or hardware are used, as needed. Yet other types of devices such as portable computers, PDAs, cell phones, portable email devices, audio players, etc. can be used in place of the computer system of FIG. 2. In general, any suitable type of device having an associated display and user input device can be employed.

User 144 operates the computer system to cause a display of a web page such as web page 131. Page server 120 provides web page 131 to the user's computer system or other user device via Internet 150. Web page 131 includes text and/or images that are the main content of the page, and also includes ad content such as ads 132, 134, 136, and 138. In one embodiment the placement of ads within a page is determined by the presence within the page definition of calls to an ad server such as optimizing engine 102. The calls are text or script placed within the page definition manually or automatically to determine the spaces that an ad might occupy. For example, a call can be placed by a human web page author when the page definition is created. The call can also be inserted by page server 120 or a different device or process when the page is created, or dynamically when the page is formed in real time in response to a user or device requesting the page. Calls can be placed in any other suitable way such as with a combination of manual and automated techniques.

One or more of the calls results in a communication to ad selection process 108 of optimizing engine 102. Ad selection process 108 determines the ad content and characteristic to be used to display the ad. Ad content is retrieved from ad definitions 106 and ad characteristics are obtained from ad characteristics 104. The ad content and characteristics are provided to the web browser executing in the user's computer system by ad selection process 108 and ad characteristics server 111, respectively, to generate the display of web page 131. The displayed page shows the ads embedded within the page and interspersed at different positions within the main content of the page. In a preferred embodiment the characteristics are communicated via serialized JavaScript™ (JSON), but other embodiments can use XML, or any other suitable mechanism.

Note that many variations to this approach are possible. For example, some types of page definitions may allow the ads to be placed on the page arbitrarily at a time of serving the page. In other words, no predetermined positions for the ads need to be coded into an original page definition, and the call functions can be achieved by other mechanisms. This would allow the optimizing engine to have more control over ad position in a page as opposed to using set calls at predetermined positions. It is also possible to have ad content and/or ad characteristics reside at a site that is remote from, and not part of, optimizing engine 102. So, for example, the ad content can be obtained from a different (i.e., third-party) server or site that is run by a person, company or other entity distinct from the entity operating the optimizing engine and distinct from the user. The ad content can still be displayed according to the ad characteristics which can come from the entity operating the optimizing engine, the entity hosting the ad definitions, or from a different entity. Each of these pieces of the ad display information can be conveyed to the user device over a digital network such as Internet 150. As is known in the art, Internet 150 is an open network system that includes many other devices such as routers, switches, servers, etc. These are shown symbolically by components 152, 154 and 156. The transfer of information via the Internet can be achieved using any suitable type and number of devices and processes, and can be achieved using with any suitable data format, protocol, standard or other present or future convention or characteristic.

Yet another approach can allow optimizing engine 102 to provide the entire web page definition to a user including ad content. In this approach it is not necessary to have separate calls for ad content since the page's main content and ad content are formed or hosted at a single site. Alternatively, calls can be included to other sites to obtain parts of the ad content to be used for one or more ads. In general, the functions described herein can be performed by the same or different devices and/or processes at one or more places and times. For example, although the optimizing engine and its components are described as being remote from the user device and communicating over the Internet, other embodiments can allow one or more of the optimizing engine components (or a portion of the components' functionalities) to operate locally with, or on, the user device.

Figure 3:
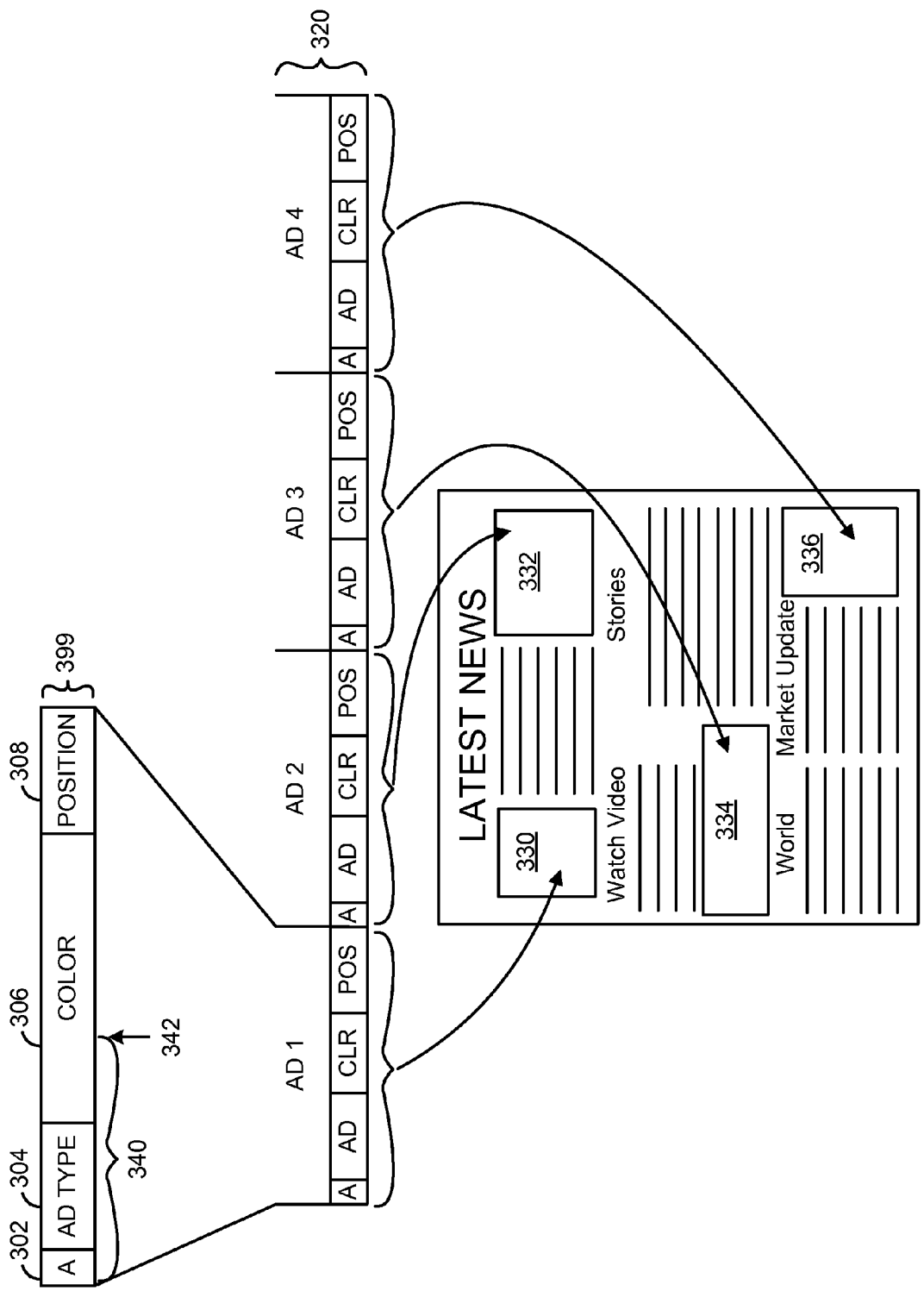
FIG. 3 shows an example format for an advertising characteristic definition.

FIG. 3 shows an example format for an ad characteristic definition 399. Ad characteristic definition 399 includes Active Indicator 302 data for whether the agent is currently enabled or not. Ad type 304 is a pointer to the actual ad content data (e.g., the ad's visual image definition) which can reside at a different server or computer system from the computer system executing the optimizing engine. Color Field 306 indicates one or more colors to be used in displaying the ad. For example, the color of a background upon which the ad content is displayed can be specified along with other color properties such as text and border colors, different colors for different fonts, hyperlink text, etc. Position Field 308 determines where within an ad slot the ad content corresponding to the Ad Type is displayed. This allows more precise control of ad positioning within a page layout.

Each ad characteristic definition defines how an ad is displayed within an ad slot in a page layout. One or more ad characteristic definitions are combined to form the agent or genome for a layout that corresponds to a particular page of main content. Agent 320 includes ad characteristic definitions for 4 ads named Ad 1, Ad 2, Ad 3 and Ad 4. Ad characteristic definition 399 has been reduced in size for purposes of illustration to be Ad 1's characteristic within agent 320.

Each ad characteristic in the set of four ad characteristics in agent 320 has the same format, but in other embodiments the formats can vary among characteristic definitions. Thus, each of Ads 1, 2, 3, and 4 have their own Active Indicator, Ad Type, Color Field and Position Field. The position of each ad characteristic definition within the agent determines the slot to which the associated ad is assigned. The characteristic definitions are mapped to the page layout by parsing the agent left-to-right, while parsing the page in a left-to-right and top-down manner. Any other approach to assigning agent definitions to a page layout is possible. Note that in other embodiments it may not be necessary to have a spatial assignment of ad characteristics with ad slots. So in FIG. 3, Ad 1 is in the first position of the agent and is assigned to slot 330, Ad 2 is in the second position of the agent and is assigned to slot 332, Ad 3 is in the third position of the agent and is assigned to slot 334 and Ad 4 is in the fourth position of the agent and is assigned to slot 336. Each Ad is displayed according to its characteristic in the agent. Thus, agent 320 determines the display of ads for a particular layout in a web page. As described in more detail below, embodiments differentiate ad characteristics from the primary content (e.g., offers of the ad) in order to improve performance of the primary content.

Figure 4:
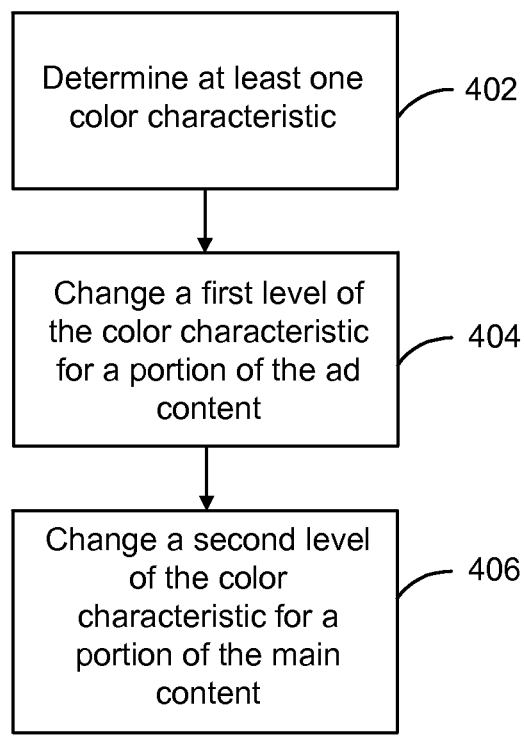
FIG. 4 illustrates an example simplified flow diagram for displaying advertising content with main content on a display device.
Figure 5:
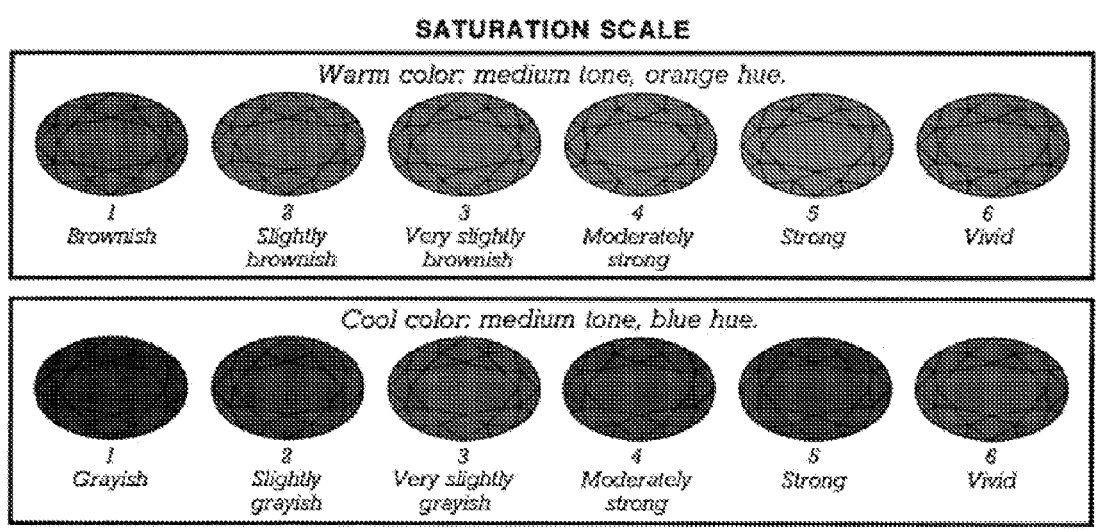
FIG. 5 shows an example saturation scale.

FIG. 4 illustrates an example simplified flow diagram for displaying advertising content with main content on a display device. After the system begins inserting ads in a given web page, in block 402, the system analyzes the web page to determine one or more color characteristics of the ad content and main content of the webpage. The ad content includes ad links and ad text. The main content includes main content links, main context text, main content background, and other main content objects. In a specific embodiment, the system determines the saturation level of the ad content and main content, the saturation level being an example of a color characteristic. FIG. 5 shows an example saturation scale 500. In other embodiments, the system may determine other color characteristics such as hue, intensity, contrast, as well as red-green-blue (RGB) characteristics.

In one embodiment, the system determines color characteristics by rendering the web page, sampling each pixel of the web page, and generating a histogram of the different colors on the web page.

The system may access a variety of sources for the color characteristics. For example, such sources may include the document object model (DOM), HTML code, color pallet, color table, display memory, etc. The DOM also provides layout information in addition to color characteristic information. These sources of information may be obtained a software application, computer, display memory, etc., or combination thereof.

In block 404, the system changes the level of a color characteristic of one or more portions of the ad content (e.g., ad link) in one direction. In block 406, the system changes the level of the color characteristic of one or more corresponding main content portions (e.g., main content link) in another direction (e.g., the opposite direction). For example, the system may increase the saturation level of the ad link(s) and decrease the saturation level of the content link(s). The steps of blocks 406 may occur in any order or substantially simultaneously. In one embodiment, the system fully saturates the color of the ad link(s). Similarly, the system may increase the saturation level of the ad text and decrease the saturation level of the main content text. Other changes are possible. For example, the system may decrease the saturation level of the ad text while increasing the saturation level of the ad link(s). Any of these combinations results in the ad link(s) being more visible to the user, which results in a higher click-through rate.

In one embodiment, before the system changes color characteristics, the system first calculates a higher saturation level for one or more portions of the ad content based on the color characteristics of the main content in the web page. In one embodiment, the system may apply a weight value to color characteristics associated with main content based on their proximity to the ad content. For example, the system may apply a higher weight value to color characteristics associated with main content that is closer to the ad content. Conversely, the system may apply a lower weight value to color characteristics associated with main content text that is farther from the ad content.

The results may then be saved to a designated memory location such as a cache. The system then serves ad content with the main content to the browser of the user. As a result, ads links have an increased click through rate, because ad links stand out relative to the surrounding content.

These steps are repeated as desired or repeated as the web page is updated with new characteristics. Note that these steps are one illustrative example of a sequence of basic steps to achieve functionality according to an embodiment of the invention. Many variations can be made to the steps including adding, removing or modifying steps or step execution.

In one embodiment, each web page of the publisher web site may be segmented onto multiple sub-pages, where a given ad can appear at the different locations on the web page. In one embodiment, the system automatically segments the web pages of a site into a distinct set of groups that may be used for learning user click habits. The system achieves this by efficiently analyzing the set of web pages that users visit and calculating the similarity of URI, HTML structure, page colors, and the set of ads that appear on the pages. In one embodiment, rules for determining which group new web pages belong to based solely on their URI are generated and used for future real time ad serving.

For example, assume the following set of URIs are provided:
  http://example.com/
  http://example.com/article/1
  http://example.com/article/2
  http://example.com/comments/2

In one embodiment, the system may determine that "http://example.com/article/1" and "http://example.com/article/2" are similar, because they have the same URI structure and list of ads. Further, the system may compare the HTML structure of "http://example.com/article/1" and "http://example.com/comments/2," and determine that they have the same list of ads and HTML structure and thus should be in the same group. The system may then place "http://example.com/" in a separate group because it has a different set of ads and HTML structure.

Figure 6:
FIG. 6 shows an example resulting web page.

FIG. 6 shows an example resulting web page 600. As FIG. 6 shows, the saturation level of the color of the ad link is increased to full saturation 602, and the saturation level of the color of the context link is reduced. Also, the color of the ad text is lightened 604. As a result, the ad link stands out more, which increases the click-through rate.

Figure 7:
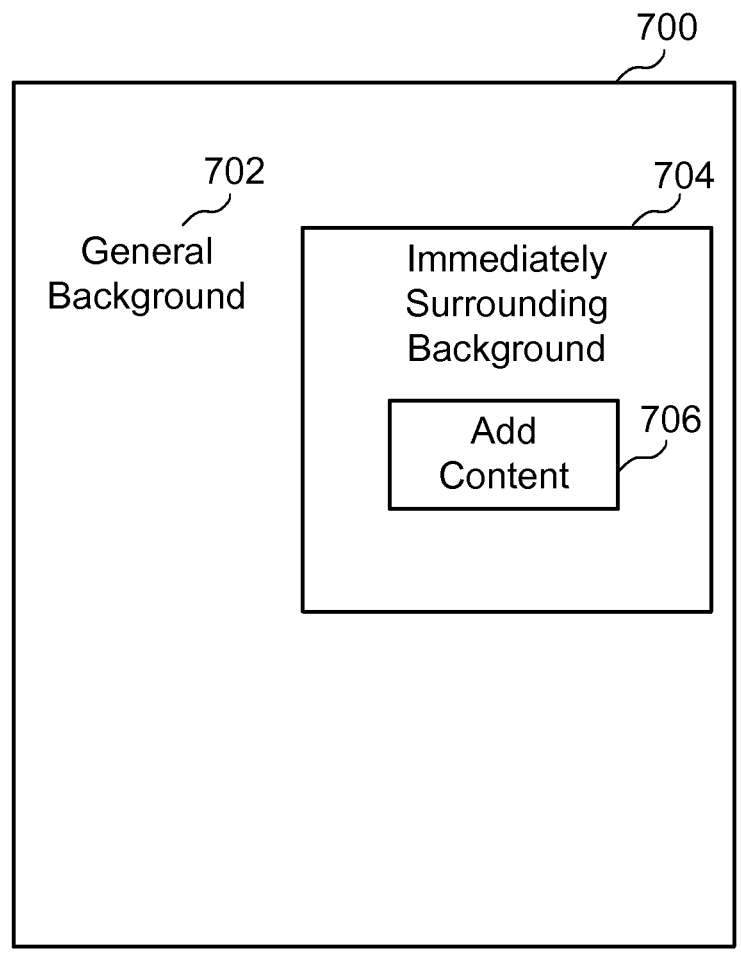
FIG. 7 shows another example resulting web page.

FIG. 7 shows an example resulting web page 700 in according to one embodiment. As FIG. 7 shows, the webpage 700 includes a general background 702 of the main content, an immediately surrounding background 704, and ad content 706. In particular embodiments, the immediately surrounding background 704 immediately surrounds the ad content 706, and the general background 702 surrounds immediately surrounding background 704 and surrounds the ad content 706.

In one embodiment, the system automatically matches at least one color characteristic of the ad content 706 with the immediately surrounding background 704. For example, if the immediately surrounding background 704 is blue and the general background 702 is green, the system will automatically match the ad content 706 to the blue of the immediately surrounding background 704 alone, and not to the green of the general background 702. Of course, other embodiments are possible where, for example, the system automatically matches the ad content 706 to the general background 702 alone or to a combination of the general background 702 and the immediately surrounding background 704. In one embodiment, the ad content 706 and the immediately surrounding background 704 is located in a sidebar.

In one embodiment, the system matches the background color to the most common color surrounding the ad. In one embodiment, the system also matches the frame color to the most common color surrounding the ad, which, in effect, disables the frame altogether. In one embodiment, the system matches the primary link or title of the ad to the default link color of the page, where the primary link or title of the ad has the changed color characteristic. In one embodiment, the system matches the text or body of the ad to the most prevalent text of the page but with alteration of the color characteristic, often but not always in inverse of the title color.

Although embodiments of the invention have been described with respect to saturation, the embodiments described herein may be implemented where the color characteristic is brightness, intensity, contrast, hue, saturation, or red-green-blue (RGB) characteristics, or any combination thereof. For example, in one embodiment where one or more color characteristics of the advertising content and the main content in a web page are determined, the one or more color determined characteristics may be at least one of, or any combination of, brightness, intensity, contrast, hue, saturation, or red-green-blue (RGB) characteristics. Then, the level of one or more of these determined color characteristics for at least one portion of the advertising content may be changed in a first direction (e.g., increased). Also, the level of one or more of these color characteristics for at least one portion of the main content may be changed in a second direction (e.g., decreased). In one embodiment, the color characteristics in the portion of the advertising content that are changed may be the same combination of color characteristics in the portion of the main content that are changed. In one embodiment, the color characteristics in the portion of the advertising content that are changed may be a different combination of color characteristics than those in the portion of the main content that are changed.

Figure 8:
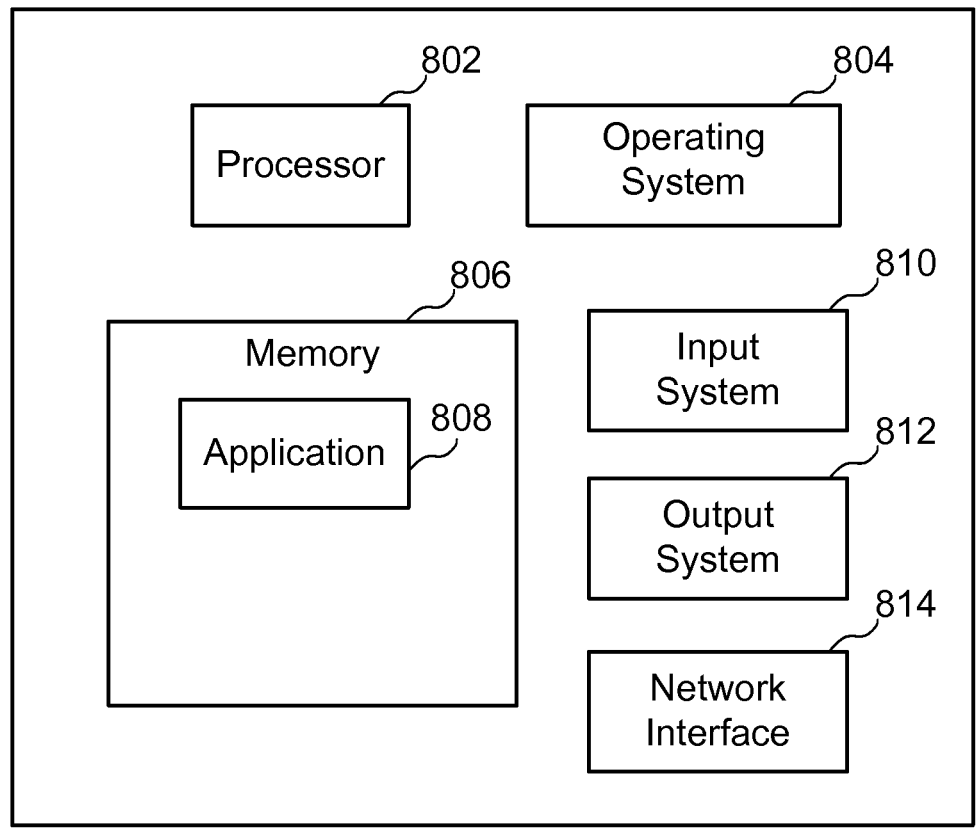
FIG. 8 illustrates a block diagram of an example embodiment of a computer system.

FIG. 8 illustrates a block diagram of an example embodiment of a computer system 800, which may be used to implement the embodiments described herein. As FIG. 8 shows, the computer system 800 includes a processor 802, an operating system 804, a memory 806, an application 808, an input system 810, an output system 812, and a network interface 814. Application 808 may be stored on memory 806 or on any other suitable storage location or computer-readable medium. Application 808 provides instructions that enable processor 802 to perform the functions to implement the embodiments described herein, such as the steps described in FIG. 4. Input system 810 may include input devices such as a keyboard, a mouse, etc., and other means for receiving information from a user and/or from other devices. Output system 812 may include output devices such as a monitor, a printer, etc., and other means for outputting information to a user and/or to other devices.

Although the invention has been described with respect to particular embodiments thereof, these particular embodiments are merely illustrative, and not restrictive. For example, although embodiments may be implemented with genetic computational procedure techniques, any other suitable programming approaches, techniques or methods can be used. For example, procedural, heuristic or a combination of both methods may be used, as desired.

Any suitable programming language can be used to implement the routines of particular embodiments including C, C++, Java, Ruby, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps that are shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain and store the program for use by or in connection with the instruction execution system, apparatus, system, or device. The computer readable medium can be, by way of example only but not by limitation a semiconductor system, apparatus, system, device, or computer memory.

Particular embodiments can be implemented in the form of control logic in software or hardware or a combination of both. The control logic, when executed by one or more processors, may be operable to perform that which is described in particular embodiments.

A "processor" or "process" includes any hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment," "an embodiment," "a specific embodiment," or "particular embodiment" means that a particular feature, structure, or characteristic described in connection with the particular embodiment is included in at least one embodiment and not necessarily in all particular embodiments. Thus, respective appearances of the phrases "in a particular embodiment," "in an embodiment," or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method for displaying advertising content on a display device, the method comprising:
    determining at least one color characteristic of the advertising content and the main content in a web page;
    increasing a first level of the at least one color characteristic for at least one portion of the advertising content, wherein the increasing of the first level comprises:
    calculating a higher level of the at least one color characteristic for the at least one portion of the advertising content based at least in part on a second level of the at least one color characteristics of the main content and based at least at least in part on a distance between the at least one portion of the advertising content and the main content;
    applying a weight value to the at least one color characteristic associated with the main content based on a distance of the main content to the at least one portion of the advertising content, wherein a higher weight value is applied to the at least one color characteristic associated when the main content is closer in distance to the at least one portion of the advertising content, and wherein a lower weight value is applied to the at least one portion of the color characteristics when the main content is farther in distance from the at least one portion of the advertising content;
    increasing the first level to a higher level; and
    decreasing the second level of the at least one color characteristic for at least one portion of the main content.

2. The method of claim 1, further comprising matching the at least one color characteristic of the advertising content with a background that is immediately surrounding the advertising content.

3. The method of claim 1, further comprising applying a weight value to the at least one color characteristic associated with the main content based on a distance of the main content to at least one portion of the advertising content.

4. The method of claim 1, wherein the at least one color characteristic is saturation level.

5. The method of claim 1, further comprising calculating a higher saturation level for one or more portions of the ad content based on the color characteristics of the main content.

6. The method of clam 1, further comprising segmenting the web page into a distinct set of groups used for learning user click habits.

7. A non-transitory computer-readable medium including program instructions for displaying advertising content on a display device, the program instructions which when executed by a computer system cause the computer system to execute a method comprising;
    determining at least one color characteristic of the advertising content and the main content in a web page;
    increasing a first level of the at least one color characteristic for at least one portion of the advertising content, wherein the increasing of the first level comprises:

calculating a higher level of the at least one color characteristic for the at least one portion of the advertising content based at least in part on a second level of the at least one color characteristics of the main content and based at least at least in part on a distance between the at least one portion of the advertising content and the main content;

applying a weight value to the at least one color characteristic associated with the main content based on a distance of the main content to the at least one portion of the advertising content, wherein a higher weight value is applied to the at least one color characteristic associated when the main content is closer in distance to the at least one portion of the advertising content, and wherein a lower weight value is applied to the at least one portion of the color characteristics when the main content is farther in distance from the at least one portion of the advertising content;

increasing the first level to a higher level; and decreasing the second level of the at least one color characteristic for at least one portion of the main content.

8. The non-transitory computer-readable medium of claim 7, further comprising program instructions for matching the at least one color characteristic of the advertising content with a background that is immediately surrounding the advertising content.

9. The non-transitory computer-readable medium of claim 7, wherein the ad content comprises ad links and ad text.

10. The non-transitory computer-readable medium of claim 7, wherein the main content comprises main content links, main context text, and main content background.

11. The non-transitory computer-readable medium of claim 7, wherein the at least one color characteristic is saturation level.

12. The non-transitory computer-readable medium of claim 7, further comprising program instructions for calculating a higher saturation level for one or more portions of the ad content based on the color characteristics of the main content.

13. The non-transitory computer-readable medium of claim 7, further comprising program instructions for segmenting the web page into a distinct set of groups used for learning user click habits.

14. A system for displaying advertising content on a display device, the system comprising:
a processor device; and
a storage device storing one or more stored sequences of instructions which when executed by the processor device cause the processor device to:

determining at least one color characteristic of the advertising content and the main content in a web page;

increasing a first level of the at least one color characteristic for at least one portion of the advertising content, wherein the increasing of the first level comprises:

calculating a higher level of the at least one color characteristic for the at least one portion of the advertising content based at least in part on a second level of the at least one color characteristics of the main content and based at least at least in part on a distance between the at least one portion of the advertising content and the main content;

applying a weight value to the at least one color characteristic associated with the main content based on a distance of the main content to the at least one portion of the advertising content, wherein a higher weight value is applied to the at least one color characteristic associated when the main content is closer in distance to the at least one portion of the advertising content, and wherein a lower weight value is applied to the at least one portion of the color characteristics when the main content is farther in distance from the at least one portion of the advertising content;

increasing the first level to a higher level; and decreasing the second level of the at least one color characteristic for at least one portion of the main content.

15. The system of claim 14, wherein the instructions further cause the processor device to match the at least one color characteristic of the advertising content with a background that is immediately surrounding the advertising content.

16. The system of claim 14, wherein the ad content comprises ad links and ad text.

17. The system of claim 14, wherein the main content comprises main content links, main context text, and main content background.

18. The system of claim 14, wherein the at least one color characteristic is saturation level.

19. The system of claim 14, wherein the instructions further cause the processor device to calculate a higher saturation level for one or more portions of the ad content based on the color characteristics of the main content.

* * * * *